United States Patent [19]

Appelbaum

[11] Patent Number: 5,027,626

[45] Date of Patent: Jul. 2, 1991

[54] LOCKABLE APPARATUS FOR SHIELDING ROTATABLE HANDLES AND LIKE ARTICLES

[76] Inventor: Paul Appelbaum, Box 27006, Denver, Colo. 80227

[21] Appl. No.: 569,866

[22] Filed: Aug. 20, 1990

[51] Int. Cl.[5] ........................ B65D 55/14; E05B 13/10; F16K 35/10

[52] U.S. Cl. ........................................ 70/164; 70/165; 70/175; 70/203; 70/DIG. 58; 137/382; 220/85 P

[58] Field of Search .................................. 70/163–166, 70/158, 212, 175, 177, 178, 180, 232, DIG. 58, 202, 203, 211; 137/382, 383, 377; 220/85 P

[56] References Cited

U.S. PATENT DOCUMENTS

| | | | |
|---|---|---|---|
| 200,599 | 2/1878 | Beachman | 70/158 |
| 1,636,641 | 7/1927 | Lewis | 70/164 |
| 1,764,367 | 6/1930 | Szymanski | 70/232 |
| 1,829,444 | 10/1931 | Goebel et al. | 70/212 |
| 2,169,438 | 8/1939 | Sherman | 70/163 |
| 3,477,607 | 11/1969 | Fuzzell et al. | 70/165 |
| 3,635,057 | 1/1972 | Foote et al. | 70/428 X |
| 4,123,924 | 11/1978 | Dworkis | 70/237 |
| 4,132,093 | 1/1979 | McDorman, Sr. | 70/165 X |
| 4,953,371 | 9/1990 | Appelbaum | 70/417 X |
| 4,959,980 | 10/1990 | Phillips | 70/164 X |

FOREIGN PATENT DOCUMENTS

| | | | |
|---|---|---|---|
| 776659 | 11/1934 | France | 70/165 |
| 287153 | 11/1952 | Switzerland | 70/232 |
| 1148817 | 4/1969 | United Kingdom | 137/383 |

*Primary Examiner*—Lloyd A. Gall
*Attorney, Agent, or Firm*—Charles C. Corbin

[57] ABSTRACT

Apparatus for lockably covering a rotatable article, such as a doorknob, fuel can cap, and the like, so as to prevent the grasping of the rotatable article, the invention including an axially extending pin attachable to the rotatable article to extend axially therefrom, and the pin having an outer end that is shaped for grasping, the apparatus of the invention further including a covering cap with a generally cylindrical main wall and which cap is open at one end, and also having a circular front wall with a generally cylindrical wall extending therefrom, the circular wall of the cap having a central aperture therein for freely receiving therethrough the pin so that the cap is freely rotatable about the pin, whereby the rotatable article is substantially received within the confines of the cap and completely surrounded thereby. There is lock means for releasably engaging the outer, shaped end of the pin so as to prevent the outward removal of the shielding cap.

4 Claims, 3 Drawing Sheets

LOCKABLE APPARATUS FOR SHIELDING ROTATABLE HANDLES AND LIKE ARTICLES

BACKGROUND

1. Field of the Invention:

The present invention relates to devices for preventing access to turnably operated articles, and more particularly relates to apparatus that is removably engaged over a turnable article to prevent grasping of the article.

2. Description of the Prior Art:

There are many turnable articles or turnably operative components such as doorknobs, caps for fuel cans, and circular handles for water line valves, for which it is desirable at times, for various reasons, to render temporarily inaccessible to handling. There are instances in which it is desirable to have a knob-operated doorway where turning of the knob is required to unlatch the doorway, there being included for economic and other reasons no key-operated locking mechanisms for the door. With such knobs it is at times desirable to have a means to prevent the operation of such knobs.

There are a good number of container cap designs, for fuel cans and caustic chemicals for example, that have safety features for preventing their operation by a child. There however remains a need for means to secure such twistable closure articles against unauthorized tampering/opening and access by persons other than small children. Popular designs for water line valves have circular handles that are difficult to lock in a fixed position to prevent their unauthorized opening or closing. Often times it is necessary to completely disattach the handle from the valve turnshaft in an effort to adequately secure such a valve.

SUMMARY OF THE INVENTION

In view of the aforestated prior art drawbacks, and to provide improvement and advantages over the prior art, it is a general object of the present invention to provide means that can be temporarily locked in place to a twistable article such as a door handle or a container cap, to prevent it from being grasped.

Another more specific object of the present invention is to provide means for releasably locking a cover over a closure cap for a container to prevent its being grasped by hand.

Still another object of the present invention is to provide lockable means to temporarily prevent the grasping of a door knob.

A still further object is to provide lockable means for preventing access to circular handles of valves, and the like.

These and other objects and advantages are provided by the present invention which comprises apparatus for securing an article that is operative by grasping and turning, and which apparatus includes a support rod that is mounted to the turnable article, the rod projecting outwardly from the article along the axis about which the article is turnable and the outer end of the rod being specially shaped and adapted for being engaged by shaped members. The invention further includes a shielding cap for the article, the cap having a cylindrical side wall that extends from the periphery of a circular end wall that has a central opening therein. The other end of the cap is open and the cylindrical side wall defines a space in which the turnable article may be received when the rod engages the central opening so that the cap is rotatably supported thereon, with the shaped end of the rod lying outwardly of the cap end wall. The invented apparatus finally includes a generally rectangular key-operated lock with a case having a front wall with an opening for receiving the shaped end of the support rod, the lock including adjacent the front wall opening, first and second opposed, shaped latching heads. The lock has an open configuration in which the latching heads are sufficiently spaced apart to admit the shaped end of the rod, and a locked configuration in which the shaped latching heads engage the shaped end of the rod so as to prevent outward movement of the lock relative to the rod, and to prevent the cap from being removed from its shielding position around the turnable article.

The accompanying drawings which form a part of the specifications illustrate a preferred embodiment of the apparatus of the present invention and together with their description serve to explain the principles of the invention.

DETAILED DESCRIPTION OF THE INVENTION

Figures 1, 3:
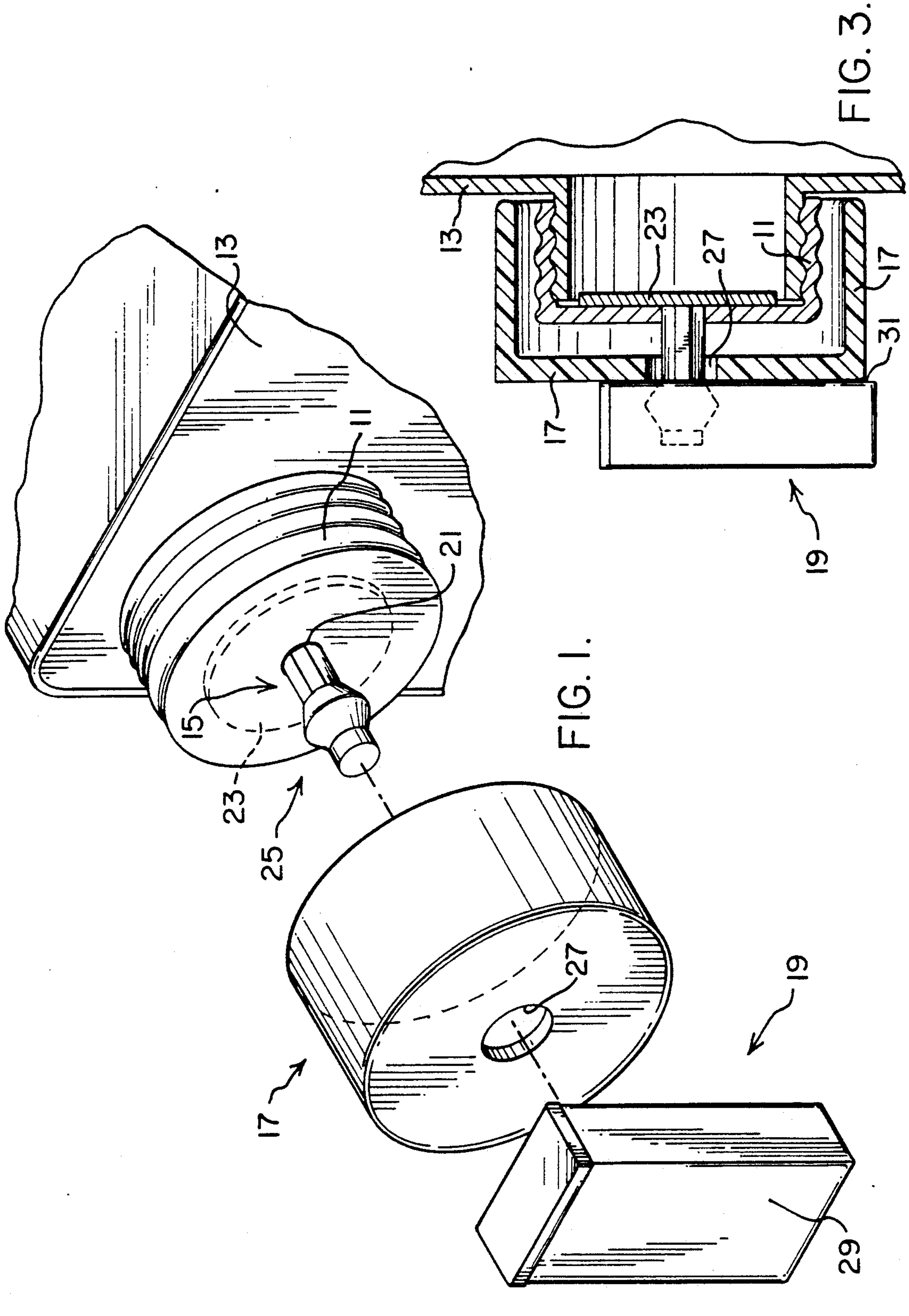
FIG. 1 is an exploded perspective view illustrating a preferred embodiment of the invention.
FIG. 3 is a sectional view taken along the line 3—3 of FIG. 2.

Turning now to the drawings FIG. 1 illustrates a preferred construction according to the present invention, which is designed to secure, in a manner to be described, the lid 11 that is threadedly attached to the spout of a fuel can 13. The main components of the invention are hereshown to include a support rod 15 which is attached to cap 11, a shielding cap 17 which is mountable to the rod 15, and a lock 19 which is securable to the outer end of rod 15 in a manner to be described.

Figure 6:
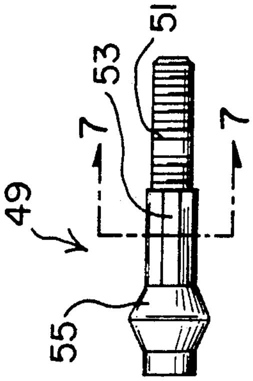
FIG. 6 is a side elevational view of a threaded support rod component according to the invention.

Rod 15 has a steel construction and has one end that resides in a central opening 21 in the lid 11 and has a flange 23 which is secured by welding or other suitable means to an inside surface of cap 11 so that the support rod 15 is held at right angles to the top of lid 11. In this preferred embodiment the outer end of rod 15 is specially shaped with a bulbous portion 25. In this regard note that the support rod illustrated in FIG. 6 shows a bulbous portion with a configuration that is the same as the portion 25 of FIG. 1. It will be seen that the lock 19 is designed to make lockable engagement with this portion 25.

The shielding cap 17 is preferably constructed of a durable plastic material, however it may also be constructed of a suitable metal. The central bore 27 in the shielding cap 17 is designed to pass the rod 15 and to allow cap 17 to be rotatably supported on rod 15, and the depth and diameter of the cylindrical walls of cap 17 are selected so as to allow cap 17 to substantially envelope the lid 11 when it is mounted on rod 15 and to be freely rotatable thereabout. FIG. 3 illustrates that when cap 15 is mounted on rod 15 the inside of its cylindrical walls are sufficiently spaced from the outside of cap 11 so as not to hinder free rotation of cap 17, and with sufficient depth to prevent the grasping of lid 11 by hand.

Figure 5:
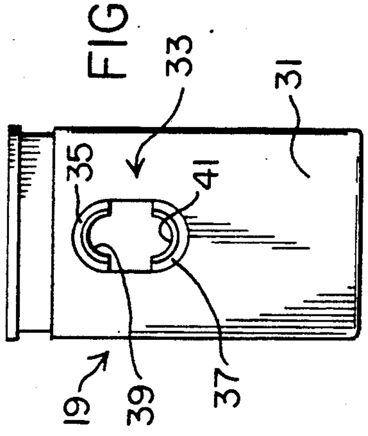
FIG. 5 is a front elevational view showing the open configuration of a preferred embodiment of the locked component of the present invention.
Figure 2:
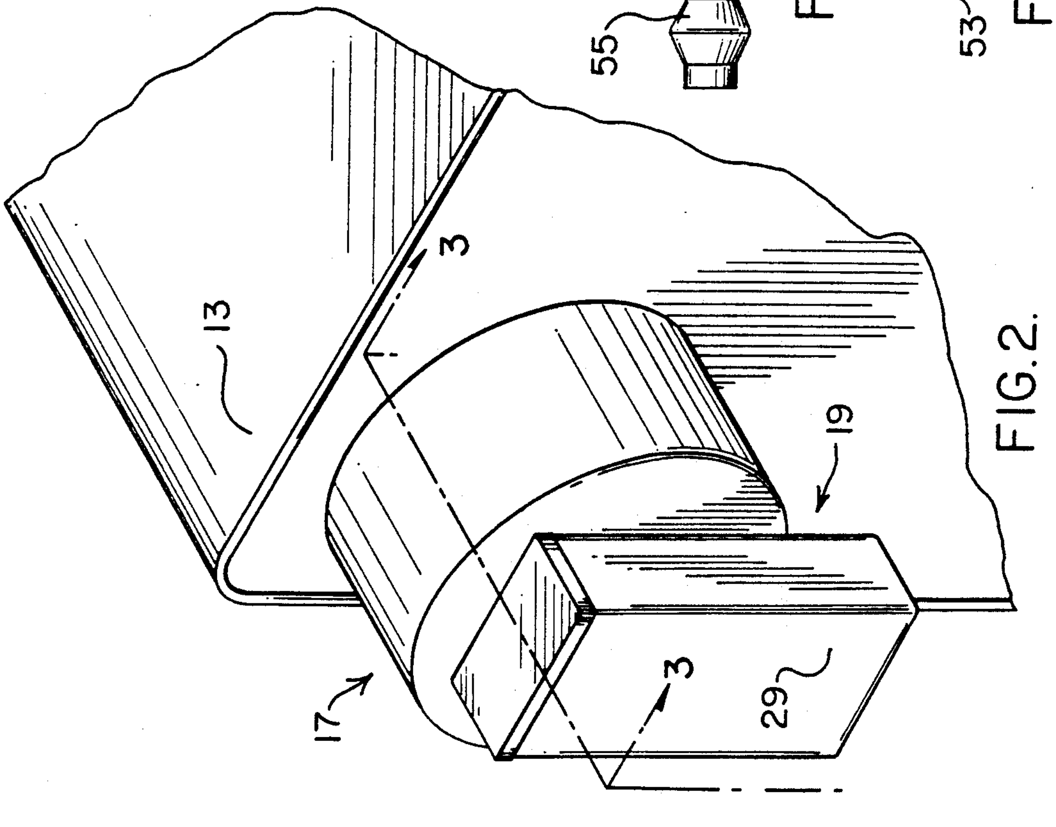
FIG. 2 is a perspective view illustrating the locked configuration of the apparatus shown in FIG. 1.

Lock 19 has a construction similar to the shackleless padlock the construction of which is fully described in U.S. Pat. No. 4,953,371, which disclosure is incorporated by reference in the present specification. FIGS. 2 and 5 illustrate that the metallic case of lock 19 includes a rear wall 29 and a front wall 31, the latter wall featuring an aperture 33 through which the end 25 of rod 15 may be passed. Not shown in FIG. 5 is a keyway in a bottom wall used for key operation of lock mechanism within the case of lock 19. Instead of a key, lock 19 may be controlled by a conventional combination mechanism, in which case the lock bottom wall, not shown, will have an access-way for the combination knobs. FIG. 5 also shows that the lock 19 features opposed latching heads 35 and 37 respectively, that lie adjacent the aperture. The latching heads 35 and 37 each provide shaped engaging surfaces 39 and 41 respectively. Note that FIG. 5 shows lock 19 in its open position in which the shaped surfaces 39 and 41 are sufficiently spaced apart to allow the bulbous end 25 of rod 15 to be positioned therebetween. Lock 19 also has a locked configuration in which the latching heads 35 and 37 are brought together so that their respective shaped portions can engage the bulbous portion 25 of rod 15 so as to hold hock 19 against outward movement relative to the rod 15. It is preferable that the aforementioned shaped portions will engage the bulbous portion 25 in a manner which allows lock 19 to be slidably rotated about the axis of rod 15 while firmly holding against outward movement of lock 19. This manner of engagement will allow a lock 19 to be spun about the axis of rod 15 without turning the article to which rod 15 is attached. Note that the differences between lock 19 herein employed and the disclosure of U.S. Pat. No. 4,953,371 lie in the differences in shape of the rod end that is grasped and the shaped portions of the latching heads for engaging the rod end. In this regard it is also understood that the invention also includes embodiments which use a rod with a grooved end and a locking means adapted to engage a grooved end as shown in U.S. Pat. No. 4,953,371. It will be apparent that the invention also includes other and various shaped configurations of the outer ends of the rod 15, as well as locks, such as lock 19, which have latching heads designed to grasp such rod ends. Note that FIG. 3 illustrates that the length of rod 15 is selected such that when lock 19 is attached as shown, its front wall 31 lies a relatively short distance from the top of the cap 17.

Figure 4:
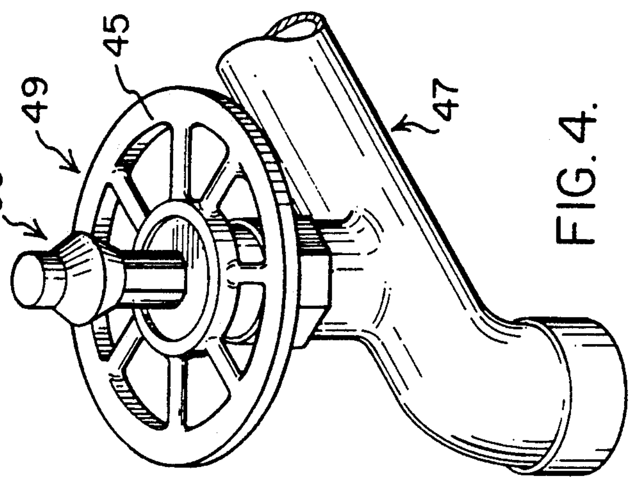
FIG. 4 is a perspective view showing a water valve handle that is adapted for application of the apparatus of the present invention.
Figure 7:
FIG. 7 is a sectional view taken along the line 7—7 of FIG. 6.
Figure 8:
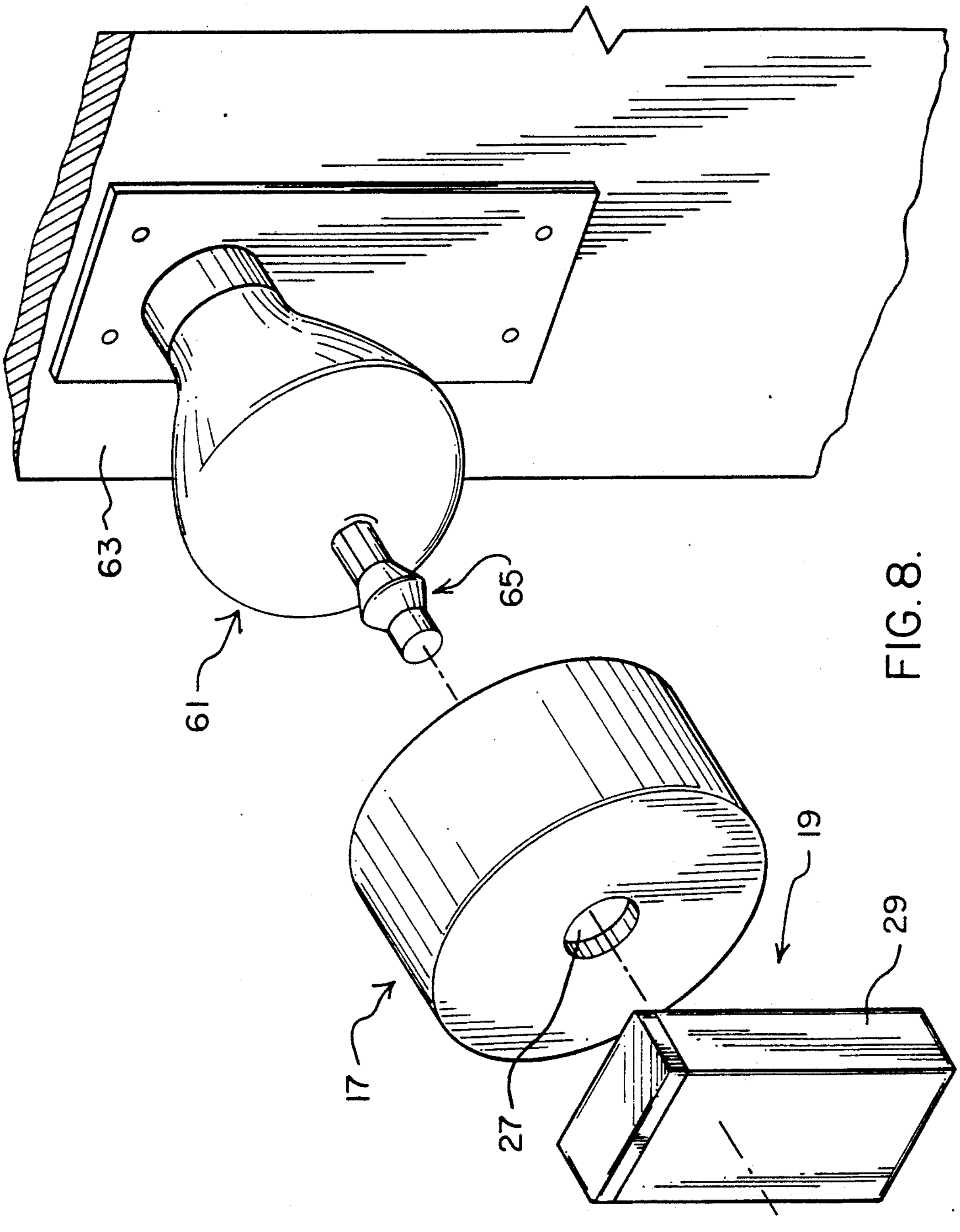
FIG. 8 is a view illustrating a door knob environment.

The principles of the present invention are applicable to constructions useful for a variety of applications to prevent the grasping of articles that are rotatably operative by hand, and FIG. 4 illustrates a variant of the invention designed for use over the circular handle 45 of a common water valve 47. Here a rod 49, best illustrated in FIG. 6, replaces the screw that normally holds handle 45. FIG. 7 shows rod 49 to have a threaded portion 51, facets 53 for tool engagement, and bulbous head 55. It will be appreciated that a cap, not shown, similar to previously described cap 17 but suitably dimensioned to cover handle 45 is to be used with a lock 19 for engaging the head 55. As seen in FIG. 8, the lock and cap are applied to a rod 65 of a door knob 61 on a door 63.

A preferred embodiment has been described and it shall be appreciated by those with ordinary skill in the art, that within the scope of the invention, various changes may be made. For example, a variant of the invention is applicable to a doorknob having an axially mounted support rod. Thus it is aimed to cover all such changes and modifications that fall within the true spirit and scope of the invention.

What is claimed is:

1. Lockable security apparatus for a rotatable article that is operable by grasping and turning, said apparatus including:

a) support rod attached to said article and projecting outwardly therefrom along the axis about which said article is turnable, and said rod having a bulbous outer end that is shaped for grasping;

b) a shielding cap for said article, said cap having a cylindrical side wall extending from the periphery of a circular end wall, and said cylindrical side wall and circular end wall defining a compartment which is greater in width that said article and which can envelope said article, and said circular end wall having a central opening for receiving said support rod therethrough so as to rotatably mount said cap thereupon; and c) generally rectangular, key-operated lock having a generally rectangular case and a front wall having an opening adapted to receive said shaped end of said support rod, said lock also including internal to its walls and adjacent said front wall opening, first and second opposed shaped latching heads, wherein said lock has an open configuration in which said latching heads are spaced apart sufficiently to receive the shaped end of said rod in a slidable manner that rotatably mounts said lock to turn about the axis of turning of said article, and a locked configuration in which said shaped latching heads are brought together and into locked engagement with the end of said rod, whereby said engaged lock will prevent the outward removal of said cap from said rod.

2. Apparatus as defined in claim 1 wherein said rotatable article is a door knob.

3. Apparatus as defined in claim 1 wherein said rotatable article is a generally circular closure cap for a container.

4. Apparatus as defined in claim 1 wherein the depth of said cap is at least as great as the depth of said article.

* * * * *